US010503393B2

(12) United States Patent
Gatland (10) Patent No.: US 10,503,393 B2
(45) Date of Patent: Dec. 10, 2019

(54) TOUCH SCREEN SONAR ADJUSTMENT SYSTEMS AND METHODS (71) Applicant: FLIR Belgium BVBA, Meer (BE)

(72) Inventor: Christopher Daniel Gatland, Fareham (GB)

(73) Assignee: FLIR Belgium BVBA, Meer (BE)

( * ) Notice: Subject to any disclaimer, the term of this patent is extended or adjusted under 35 U.S.C. 154(b) by 220 days.

(21) Appl. No.: 15/059,257

(22) Filed: Mar. 2, 2016

(65) Prior Publication Data
US 2016/0259520 A1 Sep. 8, 2016

Related U.S. Application Data (60) Provisional application No. 62/129,682, filed on Mar. 6, 2015.

(51) Int. Cl.
*G06F 3/0488* (2013.01)
*G01S 15/89* (2006.01)
*G01S 7/58* (2006.01)
*G01S 7/62* (2006.01)
*G01S 15/02* (2006.01)
*G01S 15/96* (2006.01)

(52) U.S. Cl.
CPC ............ *G06F 3/04883* (2013.01); *G01S 7/58* (2013.01); *G01S 7/629* (2013.01); *G01S 7/6218* (2013.01); *G01S 15/025* (2013.01); *G01S 15/89* (2013.01); *G01S 15/96* (2013.01)

(58) Field of Classification Search
None
See application file for complete search history.

(56) References Cited

U.S. PATENT DOCUMENTS

| 7,542,376 B1* | 6/2009 | Thompson | G01S 15/89 367/104 |
|---|---|---|---|
| 2006/0089794 A1* | 4/2006 | DePasqua | G01C 21/203 701/532 |
| 2010/0020025 A1* | 1/2010 | Lemort | G06F 3/04883 345/173 |
| 2014/0009481 A1* | 1/2014 | Butterworth | G06F 3/0484 345/581 |
| 2014/0057677 A1* | 2/2014 | Liubinas | G01S 15/96 455/556.1 |
| 2015/0035772 A1* | 2/2015 | Asahara | B63B 49/00 345/173 |

(Continued)

*Primary Examiner* — Beau D Spratt
(74) *Attorney, Agent, or Firm* — Haynes and Boone, LLP (57) ABSTRACT Techniques are disclosed for systems and methods to provide touch screen sonar adjustment for mobile structures. A sonar adjustment system includes a user interface with a touch screen display and a logic device configured to communicate with the user interface and a sonar system. The user interface is configured to receive and/or display sonar data provided by the sonar system. The logic device is configured to determine a stimulus or scroll rate component and a sample scale component of a pinch gesture performed on the touch screen display, adjust a rate and/or a sample scale factor for the touch screen display and/or for the sonar system, and render the sonar data according to the adjusted rate and/or sample scale factor. The user interface and logic device may be integrated together to form a multifunction display used to power and/or supply sonar transmission signals to the sonar system.

20 Claims, 5 Drawing Sheets (56) References Cited

U.S. PATENT DOCUMENTS

| | | | |
|---|---|---|---|
| 2015/0369908 A1* | 12/2015 | Zimmerman | G01S 15/96 367/7 |
| 2016/0011310 A1* | 1/2016 | Horner | G06T 7/11 345/419 |
| 2016/0018516 A1* | 1/2016 | Brown | B06B 1/0622 367/11 |
| 2016/0162098 A1* | 6/2016 | Kim | G06F 3/04845 345/174 |

* cited by examiner

TOUCH SCREEN SONAR ADJUSTMENT SYSTEMS AND METHODS

CROSS-REFERENCE TO RELATED APPLICATIONS

This application claims priority to and the benefit U.S. Provisional Patent Application No. 62/129,682, filed Mar. 6, 2015 and entitled "TOUCH SCREEN SONAR ADJUSTMENT SYSTEMS AND METHODS", which is hereby incorporated by reference in its entirety.

TECHNICAL FIELD

One or more embodiments of the invention relate generally to sonar systems and more particularly, for example, to systems and methods for providing adjustment for sonar systems and/or imagery.

BACKGROUND

Sonar may be used to perform bathymetry, detect underwater hazards, find fish, and/or otherwise assist in navigation by producing data and/or imagery of a water column and/or a floor of a body of water beneath a watercraft. Conventional sonar systems often include a display configured to provide traditionally recognizable sonar imagery based on the sonar data to a user.

Conventional sonar systems typically require a user to perform a number of difficult and/or non-intuitive steps to adjust operating and/or display parameters for the sonar systems, and so a user can easily miss interesting and sometimes critical features in related sonar imagery. At the same time, consumer market pressures and convenience dictate easier to use systems that include a variety of user-defined features and that produce high quality resulting imagery. Thus, there is a need for an improved methodology to provide feature-rich sonar systems, particularly in the context of providing easy adjustment of aspects of the sonar system and/or resulting imagery important to general operation of a watercraft.

SUMMARY

Techniques are disclosed for systems and methods to provide touch screen sonar adjustment for mobile structures. A sonar adjustment system may include user interfaces with touch screen displays and logic devices configured to communicate with the user interfaces and one or more sonar systems. Each user interface may be configured to receive and/or display sonar data provided by the sonar systems. The logic devices may be configured to adjust a stimulus or scroll rate or speed and/or a sample scale factor for the touch screen displays and/or the sonar systems based on pinch gestures performed on the touch screen displays. In some embodiments, user interfaces and logic devices may be integrated together to form multifunction displays used to power and/or supply sonar transmission signals to sonar systems. In other embodiments, user interfaces and logic devices may be integrated together to form portable user interfaces configured to communication with the sonar systems wirelessly.

In various embodiments, a sonar adjustment system may include one or more orientation sensors, position sensors, gyroscopes, accelerometers, and/or additional sensors, actuators, controllers, user interfaces, mapping systems, and/or other modules mounted to or in proximity to a vehicle. In further embodiments, the sonar adjustment system may be generalized to a remote sensing adjustment system and be used to adjust operation of a remote sensing system, such as radar, sonar, LIDAR, and/or other remote sensing systems (e.g., stimulus/response sensing systems), through use of a touch screen display, as described herein. Each component of the system may be implemented with a logic device adapted to form one or more wired and/or wireless communication links for transmitting and/or receiving sensor signals, control signals, or other signals and/or data between the various components.

In one embodiment, a system may include a user interface comprising a touch screen display and configured to receive and/or display sonar data provided by a sonar system, and a logic device configured to communicate with the user interface and/or the sonar system. The logic device may be configured to determine a rate component and/or a sample scale component of a pinch gesture performed on the touch screen display, adjust a rate and/or a sample scale factor for the touch screen display based, at least in part, on the determined rate and/or sample scale components, and render the sonar data according to the adjusted rate and/or sample scale factor.

In another embodiment, a method may include determining a rate component and/or a sample scale component of a pinch gesture performed on a touch screen display of a user interface, wherein the user interface is configured to receive and/or display sonar data provided by a sonar system, adjusting a rate and/or a sample scale factor for the touch screen display based, at least in part, on the determined rate and/or sample scale components, and rendering the sonar data according to the adjusted rate and/or sample scale factor.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, sonar adjustment systems utilizing a touch screen display may be provided by a user interface, a logic device, and a sonar system, and may include one or more sonar transducer assemblies, orientation sensors, gyroscopes, accelerometers, position sensors, and/or speed sensors providing measurements of an orientation, a position, an acceleration, and/or a speed of the sonar transducer assemblies and/or a coupled mobile structure. For example, the sensors may be mounted to or within the mobile structure (e.g., a watercraft, aircraft, motor vehicle, and/or other mobile structure), or may be integrated with the user interface and/or the sonar transducer assemblies. Embodiments of the present disclosure produce sonar imagery that can be focused on features within the sonar imagery using intuitive gestures performed on a touch screen, thereby providing sonar imagery that is easier to manipulate and interpret than sonar data provided by conventional systems and/or methods.

Figure 1A:
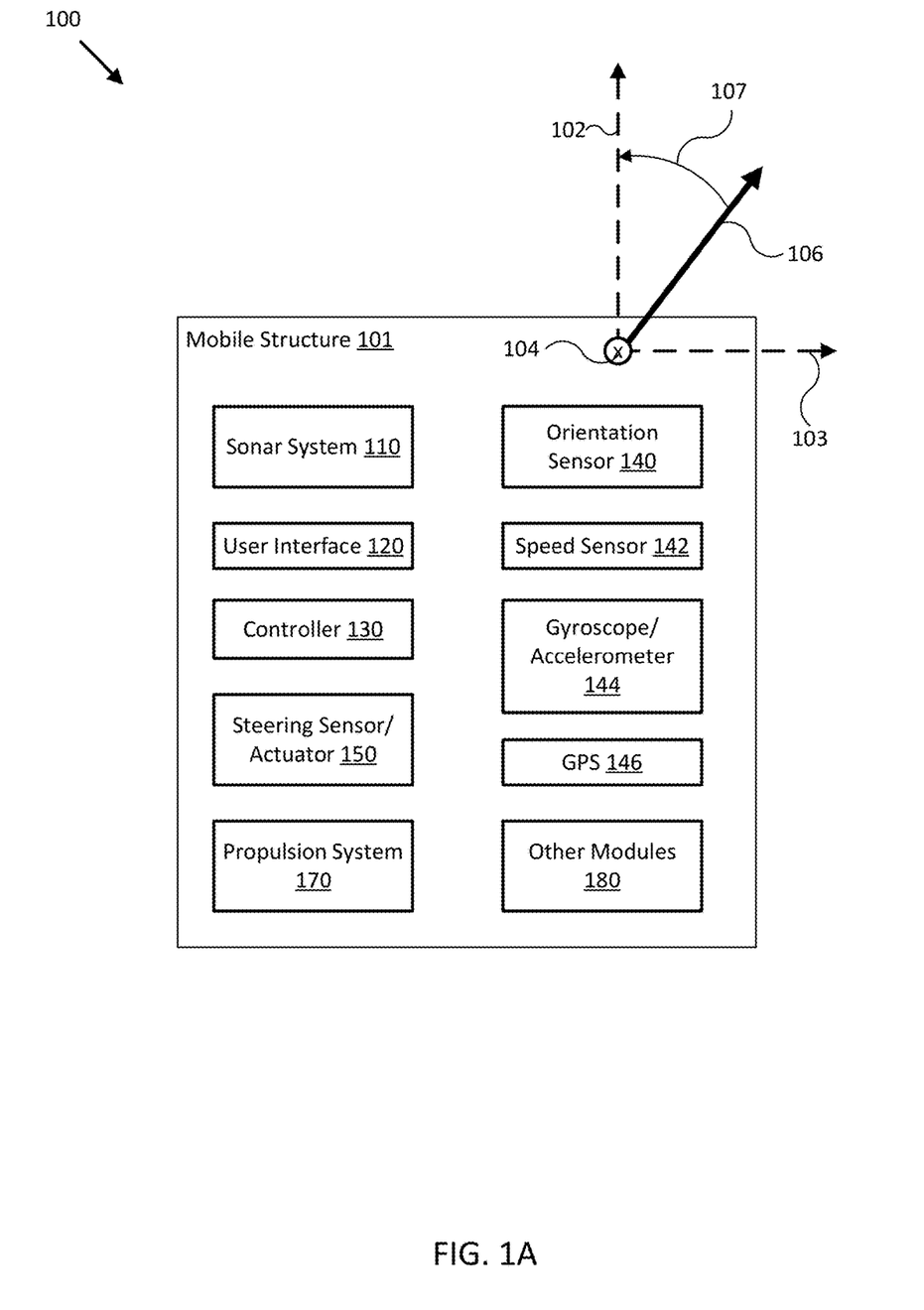
FIG. 1A illustrates a block diagram of a sonar adjustment system in accordance with an embodiment of the disclosure.

FIG. 1A illustrates a block diagram of system 100 in accordance with an embodiment of the disclosure. In various embodiments, system 100 may be adapted to measure an orientation, a position, an acceleration, and/or a speed of mobile structure 101, sonar system 110, and/or user interface 120. System 100 may then use these measurements to form various views of sonar data provided by sonar system 110 and/or to adjust an orientation of sonar system 110 according to a desired operation of sonar system 110 and/or mobile structure 101. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In further embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and cost, for example, and may be implemented with a single connection to other devices of system 100 (e.g., via an Ethernet cable with power over Ethernet, an integral power cable, and/or other communication and/or power transmission conduits integrated into a single interface cable), such as to user interface 120.

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 (e.g., or an element of mobile structure 101, such as sonar system 110 and/or user interface 120) based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared illuminators, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
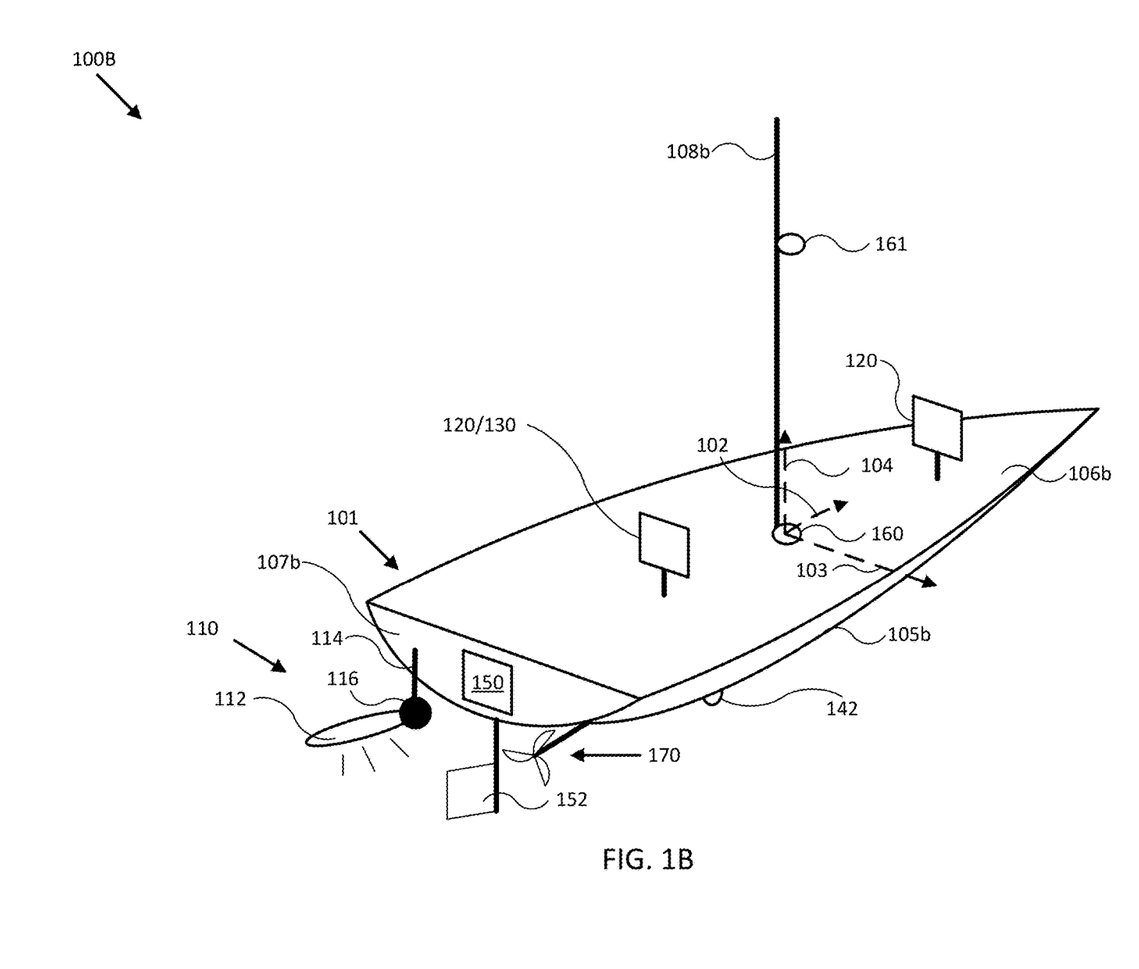
FIG. 1B illustrates a diagram of a sonar adjustment system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GPS 146), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GPS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
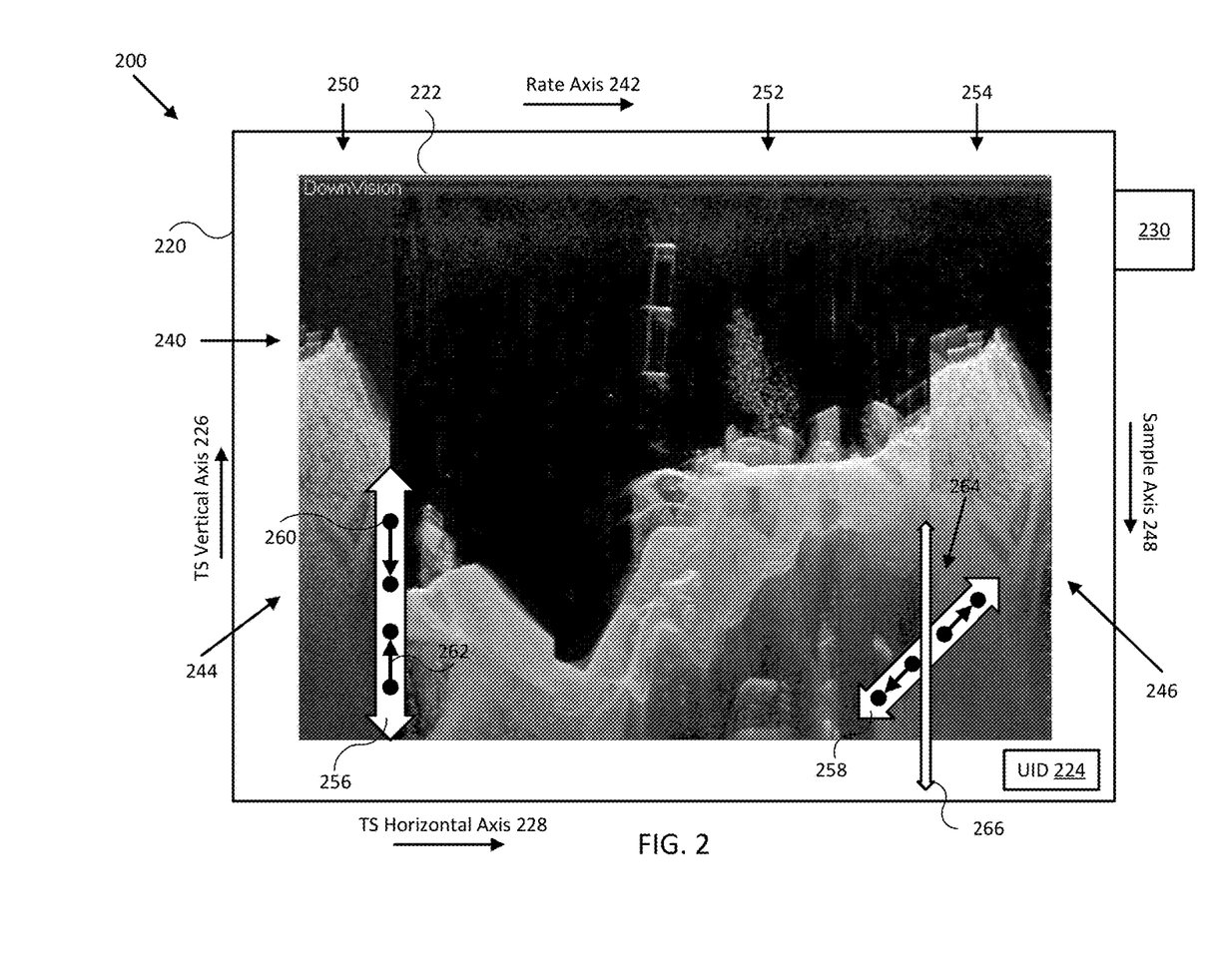
FIG. 2 illustrates a diagram of a sonar adjustment system in accordance with an embodiment of the disclosure.

FIG. 2 illustrates a diagram of a sonar adjustment system 200 including user interface 220 in accordance with an embodiment of the disclosure. In various embodiments, user interface 220 may be implemented with similar functionality as that described with reference to user interface 120 and/or controller 130 in FIGS. 1A and 1B. In the embodiment shown in FIG. 2, user interface 220 may be configured to provide sonar imagery 240 (using sonar system 110 of FIGS. 1A and 1B) to a user using touch screen display 222. For example, user interface 220 may be configured to display rendered sonar data 240 in touch screen display 222. In addition, user interface 220 may be configured to provide for adjustment of sonar system 110, as described herein.

In the embodiment shown in FIG. 2, sonar data 240 is rendered on touch screen display with the rate axis 242 of sonar data 240 substantially aligned with the horizontal axis 228 of touch screen display 222. Rate axis 242 may correspond to a stimulus or ping rate for sonar system 110, for example, and/or a scroll rate (e.g., scroll speed) for touch screen display 222. Each vertical column of data in sonar data 240 corresponds to a single ensonification or ping (e.g., stimulus) of sonar system 110, and the individual elements of sonar data arranged in each column correspond to individual samples of sonar returns at increasing delay times relative to the time of the ping, descending from the top of sonar data 240 to the bottom (e.g., as indicated by sample axis 248). In the provided embodiment, new columns of sonar data are presented at right side 246, older columns of sonar data are moved right to left, and the oldest columns of sonar data are omitted as they scroll past left side 244 of sonar data 240, as indicated by rate axis 242.

In various embodiments, the scroll rate of touch screen display 222 may be different than the stimulus rate of sonar data 240 and/or sonar system 110. If the scroll rate of touch screen display 222 is higher than the stimulus rate of sonar data 240, sonar data from a single ping may be used to populate multiple pixel columns until a new column of sonar data is provided to user interface 220. If the scroll rate of touch screen display 222 is lower than the stimulus rate of sonar data 240, sonar data from single pings may be omitted or dropped, or sonar data from multiple pings blended together (e.g., along rate axis 242) to populate the available pixel columns of touch screen 222. In addition, touch screen display 222 may be characterized with a refresh rate that may be different from the scroll rate and/or the stimulus rate. User interface 220 may be configured to adjust the refresh rate of touch screen 222 to accommodate a selected scroll rate and/or stimulus rate and/or to reduce power usage of touch screen display 222.

In some embodiments, rate axis 242 is displayed orthogonal to sample axis 248, as shown. In various embodiments, rate axis 242 and/or sample axis 248 characterize an orientation of sample data 240, and TS vertical axis 226 and/or TS horizontal axis 228 characterize an orientation of touch screen display 222, each of which may be referenced to each other and/or "down".

As can be seen in FIG. 2, sonar data 240 is segmented into three portions 250, 252, and 254, and the transitions between portions are indicated roughly by pinch gesture indicators 256 and 258. Pinch gesture indicators 256 and 258 are provided to indicate interaction of a user with touch screen display 222 and typically are not rendered using touch screen display 222. Each pinch gesture indicator corresponds to a user applying two contacts (e.g., fingers and/or stylus) to touch screen display 222 and moving the two contacts closer together or further apart while the contacts are detected by touch screen display 222.

In FIG. 2, each pinch gesture indicator includes at least two contact point pairs 260 and travel direction arrows 262. For example, at the transition between sonar data portions 250 and 252, a user applied two contacts to touch screen display 222 and moved the two contacts closer together substantially along TS vertical axis 226 (e.g., which corresponds to sample axis 248 in FIG. 2). User interface 220 may be configured to detect pinch gesture 256 and use characteristics of pinch gesture 256 to adjust operating parameters of sonar system 110 and/or display parameters for user interface 220.

For example, user interface 220 may be configured to decompose pinch gesture 256 into a rate component (e.g., a stimulus, ping, or scroll rate components substantially aligned with rate axis 242) and/or a sample scale component (e.g., substantially aligned with sample axis 248) and use such components to adjust a rate and/or a sample scale factor for touch screen display 222 and/or sonar system 110. Once the adjusted rate and/or sample scale factor are determined, user interface 220 may be configured to render sonar data 240 (e.g., old and/or new sonar data, depending on a user supplied display setting) according to the adjusted rate and/or adjusted sample scale factor.

In the embodiment shown in FIG. 2, a user has supplied pinch gesture 256 substantially along sample axis 248, and so the sample scale factor was adjusted (e.g., reduced, to zoom out from sonar data 240) and resulted in sonar data portion 252. Because there was no rate component of pinch gesture 256, the rate stayed the same in both sonar data portions 250 and 252.

In some embodiments, user interface 220 may be configured to use the sample scale factor to adjust spacing of samples as rendered on touch screen display 222. In other embodiments, user interface 220 may be configured to transmit the sample scale factor to sonar system 110 and adjust a sampling rate (not a ping rate) of sonar system 110 to adjust a density of samples within a column of sonar data 240.

Also shown in FIG. 2, at the transition between sonar data portions 252 and 254, a user has applied pinch gesture 258 with substantial components along both sample axis 248 and rate axis 242, and, as can be seen from the start and stop contact points 260 of pinch gesture 258 (e.g., start and stop contact points may be differentiated based on travel direction arrows 262), the contacts were moved further apart (e.g., which may correspond to a desire to increase the rate and/or the sample scale factor). User interface 220 may be configured to detect pinch gesture 258 and determine a corresponding rate component and/or sample scale factor component from the detected pinch gesture 258.

In some embodiments, user interface 220 may be configured to estimate reference angle 264 and/or a travel distance corresponding to contact points 260 of pinch gesture 258, for example, and use the estimated reference angle and travel distance to determine the rate and sample scale components. For example, in one embodiment, user interface 220 may be configured to determine start and/or stop positions of pinch gesture 258 (e.g., indicated by contact points 260 and travel direction arrows 262) for each of the two points of contact 260 associated with pinch gesture 258. User interface 120 may then determine an average position for each of points of contact 260 based on the corresponding start and stop positions (e.g., an average position on touch screen display 222 between the start and stop positions), for example, and determine reference angle 264 from the average position for each of the two points of contact 260. In other embodiments, user interface 220 may be configured to determine reference angle 264 just from the stop position for each of the two points of contact. User interface 220 may be configured to estimate or determine the travel distance by subtracting a first distance between the stop positions for the two points of contact 260 from a second distance between the start positions for the two points of contact 260 (e.g., as indicated by travel direction arrows 262).

In various embodiments, "stop" positions as described herein may refer to lift-off positions corresponding to removal of contacts from a detection range of touch screen display 222, for example, may refer to positions where motion of contacts has stopped or paused for a predetermined period of time, and/or may refer to current positions of contacts as sensed by touch screen 222 (e.g., relative to a sense and/or refresh rate of touch screen display 222, for example). As such, the methods of adjustment described herein may appear substantially continuous with a corresponding pinch gesture as viewed by a user of user interface 220.

As shown in FIG. 2, reference angle 264 may correspond to the angle between a longitudinal axis of pinch gesture 258 and vertical axis 226 of touch screen display 222 (e.g., always positive and less than or equal to 90 degrees). Other references are possible, such as TS horizontal axis 228, or rate axis 242 and/or sample axis 248 of sonar data 240. Reference indicator 266 is provided to indicate a measure of reference angle 264 in relation to touch screen display 222 and typically is not rendered using touch screen display 222.

Once estimated reference angle 264 and an estimated travel distance are determined, user interface 220 may be configured to use the estimated values to determine the rate and/or sample scale components. For example, in some embodiments, user interface 220 may be configured to determine an orientation for rate axis 242 and/or sample axis 248 of sonar data 240 relative to vertical and/or horizontal axes 226 and 228 of touch screen display 222, and decompose reference angle 264 and estimated travel distance (e.g., indicated by contact points 260 and travel direction arrows 262) into the rate and/or sample scale components based on reference angle 264 and the determined relative orientation for rate and/or sample axes 242 and 248.

In various embodiments, user interface 220 may be configured to adjust a rate of touch screen display 222 and/or sonar system 110, using a determined rate component of pinch gesture 258, by determining a current rate of touch screen display 222 and/or sonar system 110, multiplying the current rate by a rate adjustment ratio based, at least in part, on the rate component and/or a size of touch screen display 222 relative to the rate component, to determine the adjusted rate, and providing the adjusted rate to user interface 220 and/or sonar system 110. For example, where the rate component is negative, the rate adjustment ratio may be configured to reduce the rate of touch screen 222 and/or sonar system 110 roughly proportionally to the ratio of the magnitude of the rate component of a corresponding pinch gesture to the corresponding vertical or horizontal size of touch screen display 222. In various embodiments, the rate adjustment ratio may include multiplicative and/or additive factors selected to adjust the rate of touch screen 222 and/or sonar system 110 to visually match the magnitude of the rate component of an applied pinch gesture on touch screen 222.

Similarly, user interface 220 may be configured to adjust a sample scale factor for touch screen display 222 by determining a current sample scale factor, and multiplying the current sample scale factor by a sample scale adjustment ratio based, at least in part, on the sample scale component and/or a size of the touch screen display relative to the sample scale component, to determine the adjusted sample scale factor. In some embodiments, user interface 220 may be configured to transmit the adjusted sample scale factor to sonar system 110 to adjust the sample rate and/or sample density (not the stimulus rate) of sonar system 110 accordingly.

Once the adjusted rate and/or sample scale factor are determined, user interface 220 may be configured to render sonar data 240 on touch screen display 222 accordingly by scaling the sonar data according to the adjusted rate along a rate axis of the sonar data and/or scaling the sonar data according to the adjusted sample scale factor along a sample axis of the sonar data. In some embodiments, user interface 220 may be configured to render sonar data 240 on touch screen display 222 accordingly by rendering the sonar data on the touch screen display at a rate equal to or greater than the adjusted rate, particularly where the adjusted rate and/or sample scale factor have been provided to sonar system 110 to adjust a stimulus, sample density, and/or other operational characteristic of sonar system 110.

By facilitating separate adjustment of the rate and sample scale factor through a single gesture, embodiments of the present disclosure provide a flexible and intuitive adjustment methodology that can be used to tune multiple separate characteristics (e.g., conceptually more differentiated than orthogonal axes of a conventional pixel plot) of touch screen display 222 and/or operation of sonar system 110, at the same time, to a desired parameter locus.

Although sonar data 240 is shown in FIG. 2 as including multiple portions 250, 252, and 254 with transitions between adjusted rates and/or sample scale factors, in other embodiments, a pinch gesture, such as pinch gesture 258, may be used to adjust the entirety of the displayed sonar data 240 in addition to applying to newly acquired sonar data arriving at right side 246, for example. In such embodiments, user interface 220 may be configured to render all portions of sonar data 240 according to an adjusted rate and/or sample scale factor. In some embodiments, an indicator, similar to pinch gesture indicator 258, may be rendered on touch screen display 222 to provide visual feedback to a user providing a pinch gesture to touch screen display 222.

In various embodiments, user interface 220 may include one or more controllers, memory, other sensors, touch screen display 222, communication modules, and/or other modules 224 facilitating operation of user interface 220, which may or may not all be disposed within a common housing (e.g., to form a multifunction display). In some embodiments, one or more of such modules may be integrated with a stationary user interface and/or mount (e.g., coupled to deck 106b or mast/sensor mount 108b of mobile structure 101 in FIG. 1B) and be configured to communicate with devices within the housing of user interface 220 through one or more communication modules. As shown in FIG. 2, user interface 220 may include input/output port 230, for example, which may be used to couple to other elements of system 100 of FIG. 1A or system 100B of FIG. 1B. In one embodiment, user interface 220 may be implemented as a multifunction display with power and/or transmitter circuitry allowing user interface 220 to power and/or provide sonar transmission signals to sonar system 110 over port 230.

Touch screen display 222 may be implemented as one or more LCDs, OLEDs, projection devices, and/or other digital displays that may be configured to display sonar data (e.g., from sonar system 110 of FIGS. 1A and 1B) and detect touches (e.g., start, travel, path, stop, and/or other touch characteristics of two or more points of contact) on touch screen display 222. In some embodiments, touch screen display may be configured to detect multiple points of contact for a single finger or stylus, for example. In such embodiments, user interface 220 may be configured to differentiate groups of contact points corresponding to separate fingers and/or stylus based on trajectory and/or locality, for example, and use such differentiated groups to provide a higher accuracy estimate of the reference angle and/or travel distance of a pinch gesture, as described herein.

Other modules 224 may include other and/or additional sensors, sensor arrays, actuators, logic devices, communications modules/nodes, power and/or power distribution components, and/or user interface devices (UIDs, labeled accordingly in FIGS. 2 and 3) used to provide additional environmental information and/or configuration parameters, for example, and/or to adjust a position and/or orientation of user interface 220. In some embodiments, other modules 224 may include various environmental sensors providing measurements and/or other sensor signals that can be displayed to a user and/or used by other devices of user interface 220 to facilitate operation of user interface 220. In some embodiments, other modules 224 may include one or more buttons and/or other user input devices configured to accept manual user input separate from touch screen display 222.

In various embodiments, user interface 220 may be implemented in a single housing with a single display (e.g., touch screen display 222) adapted to be held by a user while the user views the display. In other embodiments, the housing may be mounted to a mobile structure using a fixed or actuated mount to provide a fixed or actuated view relative to an orientation of the mobile structure.

Figure 3:
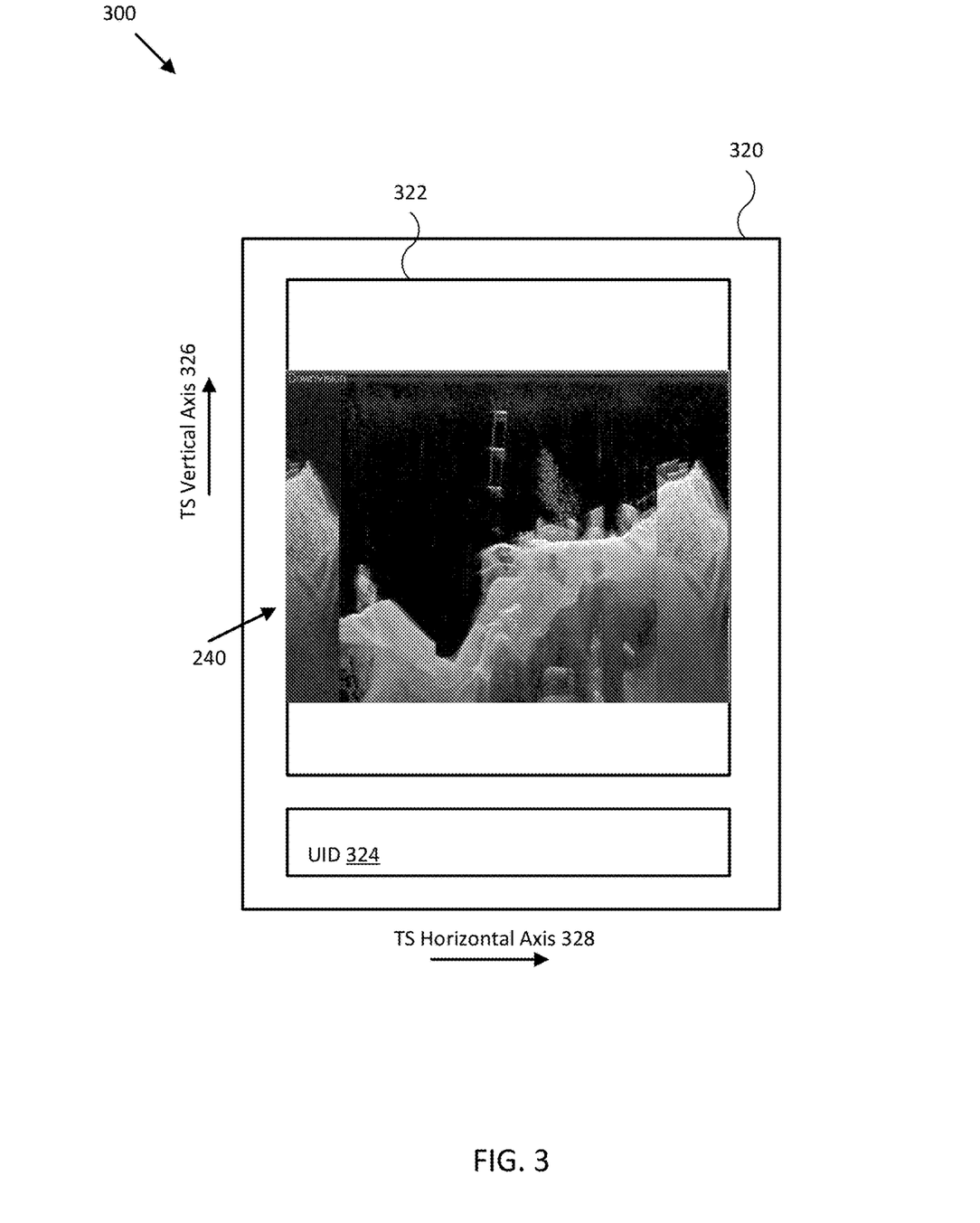
FIG. 3 illustrates a diagram of a sonar adjustment system in accordance with an embodiment of the disclosure.

FIG. 3 illustrates a diagram of a sonar adjustment system 300 including portable user interface 320 in accordance with an embodiment of the disclosure. In the embodiment shown in FIG. 3, user interface 320 is implemented as a portable electronic device, such as a tablet or smart phone, for example, that is configured to receive and/or display sonar data 240 from sonar system 110 over a wireless communication link. As shown, user interface 320 includes touch screen display 322 characterized by touch screen vertical axis 326 and touch screen horizontal axis 328. In various embodiments, user interface 320 may be implemented with any of the functionality described with respect to user interface 220 of FIG. 2. In some embodiments, user interface 320 may be configured to adjust the vertical and horizontal axes of touch screen 322 based on a detected orientation of user interface 320. For example, user interface 320 may be configured to substantially align TS vertical axis 326 with a gravitationally defined down vector as user interface 320 is rotated through 90 degree increments relative to the down vector.

Figure 4:
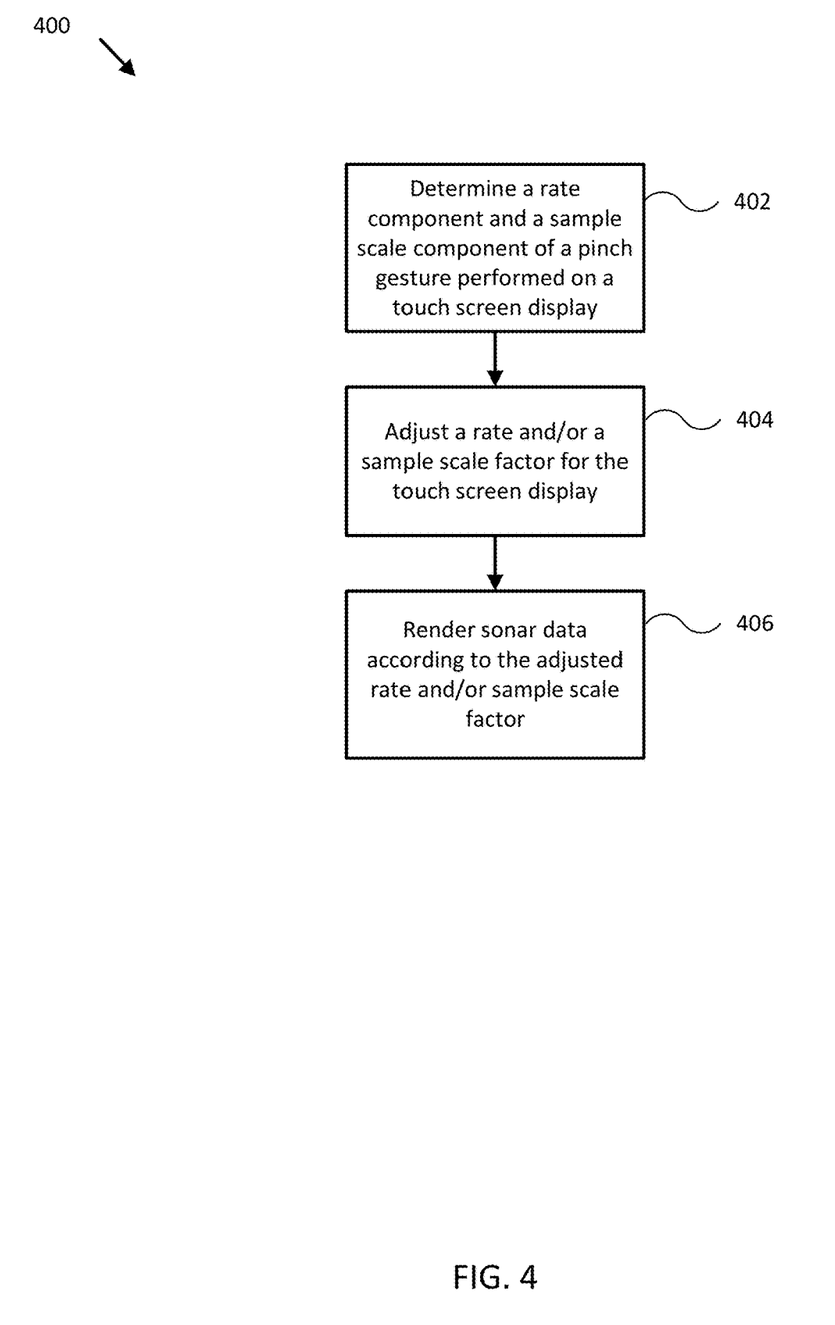
FIG. 4 illustrates a flow diagram of various operations to operate a sonar adjustment system in accordance with an embodiment of the disclosure.

FIG. 4 illustrates a flow diagram of process 400 to provide sonar adjustment for mobile structure 101 in accordance with embodiments of the disclosure. In some embodiments, the operations of FIG. 4 may be implemented as software instructions executed by one or more logic devices associated with corresponding electronic devices, sensors, and/or structures depicted in FIGS. 1A through 3. More generally, the operations of FIG. 4 may be implemented with any combination of software instructions and/or electronic hardware (e.g., inductors, capacitors, amplifiers, actuators, or other analog and/or digital components).

It should be appreciated that any step, sub-step, sub-process, or block of process 400 may be performed in an order or arrangement different from the embodiments illustrated by FIG. 4. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 400 is described with reference to systems described in reference to FIGS. 1A-3, process 400 may be performed by other systems different from those systems and including a different selection of electronic devices, sensors, assemblies, mobile structures, and/or mobile structure attributes.

Process 400 represents a method for providing sonar adjustment using systems 100, 100B, 200, and/or 300 in accordance with embodiments of the disclosure. At the initiation of process 400, various system parameters may be populated by prior execution of a process similar to process 400, for example, or may be initialized to zero and/or one or more values corresponding to typical, stored, and/or learned values derived from past operation of process 400, as described herein.

In block 402, a logic device determines a rate component and/or a sample scale component of a pinch gesture performed on a touch screen display. For example, user interface/controller 120/130 of system 100B, user interface 220 of system 200, and/or user interface 320 of system 300 may be configured to determine a rate component and/or a sample scale component of a pinch gesture (e.g., similar to pinch gestures 256 or 258) performed on a touch screen display (e.g., touch screen displays 222 or 322). In various embodiments, user interface 220 and/or 320 may be configured to provide for user selection of a particular rate (e.g., scroll, stimulus, ping, and/or other rate of touch screen 222 and/or sonar system 110) to be associated with the rate component.

In some embodiments, user interface 220 and/or 320 may be configured to determine the rate component and/or the sample scale component by detecting the pinch gesture, estimating a reference angle and a travel distance corresponding to two points of contact associated with the detected pinch gesture, and determining the rate component and/or the sample scale component from the estimated reference angle and travel distance. In a related embodiment, user interface 220 and/or 320 may be configured to estimate the reference angle by determining start and stop positions of the detected pinch gesture for each of the two points of contact, determining an average position for each of the two points of contact based on the corresponding start and stop positions, and determining the reference angle from the determined average position for each of the two points of contact. In a further embodiment, user interface 220 and/or 320 may be configured to estimate the reference angle by determining a stop position of the detected pinch gesture for each of the two points of contact and determining the reference angle from the determined stop position. In other embodiments, user interface 220 and/or 320 may be configured to estimate the travel distance by determining start and stop positions of the detected pinch gesture for each of the two points of contact and determining the travel distance by subtracting a first distance between the stop positions for the two points of contact from a second distance between the start positions for the two points of contact.

In various embodiments, user interface 220 and/or 320 may be configured to determine the rate component and/or the sample scale component from the estimated reference angle and travel distance by determining an orientation for a rate axis and/or a sample axis of the sonar data relative to the touch screen display and decomposing (e.g., using trigonometry, for example) the estimated reference angle and travel distance into the rate and/or sample scale components based on the reference angle and the determined orientation for the rate and/or sample axes.

In block 404, a logic device adjusts a rate and/or a sample scale factor for a touch screen display. For example, user interface/controller 120/130 of system 100B, user interface 220 of system 200, and/or user interface 320 of system 300 may be configured to adjust a scroll and/or stimulus rate and/or a sample scale factor for touch screen display 222 and/or 322 and/or for sonar system 110 based, at least in part, on the rate and/or sample scale components determined in block 402.

In one embodiment, user interface 220 of system 200 and/or user interface 320 of system 300 may be configured to adjust the rate and/or the sample scale factor for the touch screen display by determining a current rate and/or a current sample scale factor, multiplying the current rate by a rate adjustment ratio based, at least in part, on the rate component and/or a size of the touch screen display relative to the rate component, to determine the adjusted rate, and/or multiplying the current sample scale factor by a sample scale adjustment ratio based, at least in part, on the sample scale component and/or a size of the touch screen display relative to the sample scale component, to determine the adjusted sample scale factor. In some embodiments, user interface 220 of system 200 and/or user interface 320 of system 300 may be configured to transmit the adjusted rate and/or the adjusted sample scale factor to sonar system 110 to similarly adjust a stimulus rate and/or a sample density (not a ping rate) of sonar system 110. In such embodiments, user interface 220 and/or 320 may be configured to render an indicator or selection menu on touch screen 222 and/or 320 to determine whether the adjusted rate and/or sample scale factor are used solely to adjust rendering on touch screen 222 or are also used to adjust operation of sonar system 110. In various embodiments, the indicator or selection menu may be provided before detecting a pinch gesture, for example, or may be provided momentarily after completing a pinch gesture.

In block 406, a logic device renders sonar data according to an adjusted rate and/or sample scale factor. For example, user interface/controller 120/130 of system 100B, user interface 220 of system 200, and/or user interface 320 of system 300 may be configured to render sonar data 240 according to the adjusted rate and/or sample scale factor determined in block 406. In one embodiment, user interface 220 of system 200 and/or user interface 320 of system 300 may be configured to render the sonar data according to the adjusted rate and/or sample scale factor by scaling the sonar data according to the adjusted rate along a rate axis of the sonar data and/or scaling the sonar data according to the adjusted sample scale factor along a sample axis of the sonar data. In some embodiments, user interface 220 of system 200 and/or user interface 320 of system 300 may be configured to render sonar data 240 according to the adjusted rate and/or sample scale factor by rendering sonar data 240 on touch screen display 222 or 322 at a rate (e.g., a refresh rate) equal to or greater than the adjusted rate. In such embodiments, this can ensure all available sonar data is rendered when the adjusted rate and/or sample scale factor have been provided to sonar system 110 to adjust a stimulus, sample density, and/or other operational characteristic of sonar system 110.

By facilitating adjustment of the rate and sample scale factor separately but through a single gesture, embodiments of the present disclosure provide a flexible and intuitive methodology that can be used to adjust operation of user interface 222, sonar system 110, and/or other elements of system 100 with relatively little user interaction. Minimizing user interaction can be particularly helpful to reduce stress and/or distraction of a user of a mobile structure during critical maneuvers managed through use of a remote sensing system, such as sonar system 110.

It is contemplated that any one or combination of methods to provide sonar adjustment may be performed according to one or more operating contexts of a control loop, for example, such as a startup, learning, running, and/or other type operating context. For example, process 400 may proceed back to block 402 and proceed through process 400 again to produce sonar adjustment, as in a control loop.

Embodiments of the present disclosure can thus provide sonar adjustment using a touch screen display. Such embodiments may be used to provide sonar imagery to assist in navigation for a mobile structure, survey of a body of water, and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a user interface comprising a touch screen display and configured to receive and/or display sonar data provided by a sonar system; and
a logic device configured to communicate with the user interface and/or the sonar system, wherein the logic device is configured to:
determine a rate component and a sample scale component of a pinch gesture performed on the touch screen display, wherein the determined rate component controls, at least in part, a stimulus of the sonar system;
adjust a rate and a sample scale factor for the touch screen display based, at least in part, on the determined rate and sample scale components; and
render the sonar data according to the adjusted rate and sample scale factor;
wherein determining the rate component and/or the sample scale component comprises:
detecting the pinch gesture performed on the touch screen display;
estimating a reference angle and a travel distance corresponding to two points of contact associated with the detected pinch gesture; and
determining the rate component and/or the sample scale component from the estimated reference angle and travel distance.

2. The system of claim 1, wherein the logic device is configured to provide the adjusted rate and/or the adjusted sample scale factor to the sonar system to adjust a stimulus rate and/or a sample density of the sonar system, wherein the stimulus rate comprises an ensonification or ping rate of the sonar system.

3. The system of claim 1, wherein estimating the reference angle comprises:
determining start and stop positions of the detected pinch gesture for each of the two points of contact associated with the detected pinch gesture;
determining an average position for each of the two points of contact based on the corresponding determined start and stop positions; and
determining the reference angle from the determined average position for each of the two points of contact.

4. The system of claim 1, wherein estimating the reference angle comprises:
determining a stop position of the detected pinch gesture for each of the two points of contact; and
determining the reference angle from the determined stop position for each of the two points of contact.

5. The system of claim 1, wherein estimating the travel distance comprises:
determining start and stop positions of the detected pinch gesture for each of the two points of contact; and
determining the travel distance by subtracting a first distance between the stop positions for the two points of contact from a second distance between the start positions for the two points of contact.

6. The system of claim 1, wherein determining the rate component and/or the sample scale component from the estimated reference angle and travel distance comprises:
determining an orientation for a rate axis and/or a sample axis of the sonar data relative to the touch screen display; and
decomposing the estimated reference angle and travel distance into the rate and/or sample scale components based on the reference angle and the determined orientation for the rate and/or sample axes.

7. The system of claim 1, wherein the rate component corresponds to a scroll rate for the touch screen display, and wherein adjusting the rate and/or the sample scale factor for the touch screen display comprises:
determining a current rate and/or a current sample scale factor;
multiplying the current rate by a rate adjustment ratio based, at least in part, on the rate component and/or a size of the touch screen display relative to the rate component, to determine the adjusted rate; and/or multiplying the current sample scale factor by a sample scale adjustment ratio based, at least in part, on the sample scale component and/or a size of the touch screen display relative to the sample scale component, to determine the adjusted sample scale factor.

8. The system of claim 1, wherein rendering the sonar data according to the adjusted rate and/or sample scale factor comprises:

scaling the sonar data according to the adjusted rate along a rate axis of the sonar data; and/or scaling the sonar data according to the adjusted sample scale factor along a sample axis of the sonar data.

9. The system of claim 1, further comprising the sonar system, wherein:

the sonar system is configured to be coupled to a mobile structure comprising a watercraft, aircraft, and/or a motor vehicle;

the user interface and the logic device are integrated together to form a multifunction display; and the multifunction display is configured to provide power and/or sonar transmission signals to a sonar transducer assembly of the sonar system.

10. The system of claim 1, wherein:

the user interface and the logic device are integrated together to form a portable user interface; and the portable user interface is configured to communicate with the sonar system over a wireless communication link.

11. A system comprising:

a user interface comprising a touch screen display and configured to receive and/or display sonar data provided by a sonar system; and a logic device configured to communicate with the user interface and/or the sonar system, wherein the logic device is configured to:

detect a pinch gesture performed on the touch screen display;

determine a rate component and a sample scale component of the pinch gesture performed on the touch screen display, wherein the determined rate component controls, at least in part, a stimulus of the sonar system;

adjust a rate and a sample scale factor for the touch screen display based, at least in part, on the determined rate and sample scale components; and render the sonar data according to the adjusted rate and sample scale factor;

wherein the logic device is configured to provide the adjusted rate and/or the adjusted sample scale factor to the sonar system to adjust a stimulus rate and/or a sample density of the sonar system, wherein the stimulus rate comprises an ensonification or ping rate of the sonar system.

12. A method comprising:

determining a rate component and a sample scale component of a pinch gesture performed on a touch screen display of a user interface, wherein the user interface is configured to receive and/or display sonar data provided by a sonar system, wherein the determined rate component controls, at least in part, a stimulus of the sonar system;

adjusting a rate and a sample scale factor for the touch screen display based, at least in part, on the determined rate and sample scale components; and rendering the sonar data according to the adjusted rate and sample scale factor;

wherein determining the rate component and/or the sample scale component comprises:

detecting the pinch gesture performed on the touch screen display;

estimating a reference angle and a travel distance corresponding to two points of contact associated with the detected pinch gesture; and determining the rate component and/or the sample scale component from the estimated reference angle and travel distance.

13. The method of claim 12, wherein:

the sonar system is configured to be coupled to a mobile structure comprising a watercraft, aircraft, and/or a motor vehicle;

the user interface forms a multifunction display; and the multifunction display is configured to provide power and/or sonar transmission signals to a sonar transducer assembly of the sonar system.

14. The method of claim 12, wherein estimating the reference angle comprises:

determining start and stop positions of the detected pinch gesture for each of the two points of contact associated with the detected pinch gesture;

determining an average position for each of the two points of contact based on the corresponding determined start and stop positions; and determining the reference angle from the determined average position for each of the two points of contact.

15. The method of claim 12, wherein estimating the reference angle comprises:

determining a stop position of the detected pinch gesture for each of the two points of contact; and determining the reference angle from the determined stop position for each of the two points of contact.

16. The method of claim 12, wherein estimating the travel distance comprises:

determining start and stop positions of the detected pinch gesture for each of the two points of contact; and determining the travel distance by subtracting a first distance between the stop positions for the two points of contact from a second distance between the start positions for the two points of contact.

17. The method of claim 12, wherein determining the rate component and/or the sample scale component from the estimated reference angle and travel distance comprises:

determining an orientation for a rate axis and/or a sample axis of the sonar data relative to the touch screen display; and decomposing the estimated reference angle and travel distance into the rate and/or sample scale components based on the reference angle and the determined orientation for the rate and/or sample axes.

18. The method of claim 12, wherein adjusting the rate and/or the sample scale factor for the touch screen display comprises:

determining a current rate and/or a current sample scale factor;

multiplying the current rate by a rate adjustment ratio based, at least in part, on the rate component and/or a size of the touch screen display relative to the rate component, to determine the adjusted rate; and/or multiplying the current sample scale factor by a sample scale adjustment ratio based, at least in part, on the sample scale component and/or a size of the touch screen display relative to the sample scale component, to determine the adjusted sample scale factor.

19. The method of claim 12, further comprising:
providing the adjusted rate and/or the adjusted sample scale factor to the sonar system to adjust a stimulus rate and/or a sample density of the sonar system, wherein the stimulus rate comprises an ensonification or ping rate of the sonar system.

20. The method of claim 12, wherein rendering the sonar data according to the adjusted rate and/or sample scale factor comprises:
scaling the sonar data according to the adjusted rate along a rate axis of the sonar data; and/or
scaling the sonar data according to the adjusted sample scale factor along a sample axis of the sonar data.

\* \* \* \* \*